April 27, 1954  J. S. WILCOX  2,676,488
QUANTITATIVE FLOW INDICATOR
Filed Aug. 15, 1949

INVENTOR.
JOHN STEWART WILCOX
BY
Fulwider & Mattingly
Attorney

Patented Apr. 27, 1954

2,676,488

UNITED STATES PATENT OFFICE 2,676,488

QUANTITATIVE FLOW INDICATOR

John Stewart Wilcox, Inglewood, Calif., assignor to Technical Instrument Laboratory, Los Angeles, Calif., a copartnership Application August 15, 1949, Serial No. 110,299

1 Claim. (Cl. 73—228)

This invention relates to quantitative flow indicators and has particular reference to an indicator which will at all times give an indication of the quantity of flow of a fluid through a line per unit of time.

In many industrial applications it is desired to measure the flow of liquid through a liquid supply or pipe line to enable an observer to determine the quantity of liquid flowing through the line per minute, per second or other unit of time in order to readily ascertain and permit the control of the quantitative flow of fluid through the line. Heretofore it has been the practice to employ metering orifices in connection with flow meters which rely upon the difference in pressures between the up stream and down stream sides of the orifice for determining the rate of flow of the liquid in the line.

It is an object of this invention to provide a quantitative flow meter which may be connected directly in series connection in a pipe line to produce a constant indication readily observable and readily readable in terms of gallons or other units of quantity per second, minute or other unit of time.

Another object of this invention is to provide a flow meter of the character described in which the indicator includes a member adapted to be disposed in the flow stream in such fashion that the position which the member will assume is a direct indication of the quantity of fluid flowing through the meter in a given period of time.

Another object of the invention is to provide a quantitative flow indicator of the character described wherein the movable member is in effect a barrier pivoted in the flow stream to be impinged upon by the fluid flowing through the meter to swing the barrier member about its pivot to progressively increase the area of the flow passage in the meter as the quantity of fluid flowing through the meter per unit of time increases, and in which the position assumed by the barrier is a direct indication of the quantitative flow.

Another object of the invention is to provide a meter of the character described wherein the barrier is biased to a "no-flow" position and in which the biasing means exerts uniformly increasing resistance to the movement of the barrier as the barrier is progressively moved from the no-flow position by the quantity of fluid passing through the meter.

Another object of this invention is to provide a flow meter of the character described wherein a flow chamber is provided, having parallel front and rear walls defining a chamber across which extends a pivoted barrier, against which the liquid will impinge as it passes through the meter, and in which the pivotal axis and the wall of the flow chamber adjacent the free end of the barrier are so arranged that movement of the barrier about its axis progressively increases the flow passage between the barrier end and the adjacent flow chamber wall as the quantity of fluid flowing through the chamber increases.

Another object of the invention is to provide a flow meter of the character described wherein a mechanism is employed for manually positively moving the barrier in both directions to permit the observer to determine whether or not the meter is in working order.

Other objects and advantages of this invention will be apparent from a study of the following specifications, read in connection with the accompanying drawing, wherein.

Figure 1:
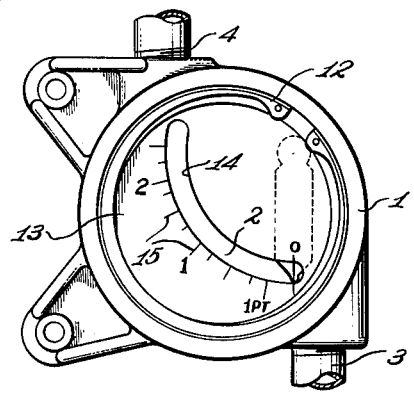
Fig. 1 is an elevational view of a meter constructed in accordance with this invention.

Referring to the drawings, there is illustrated in Fig. 1 a flow meter comprising a case 1 which may be of any desired configuration provided with a flow chamber 2 and with an inlet opening 3 and an outlet opening 4 communicating with the flow chamber 2.

Figure 2:
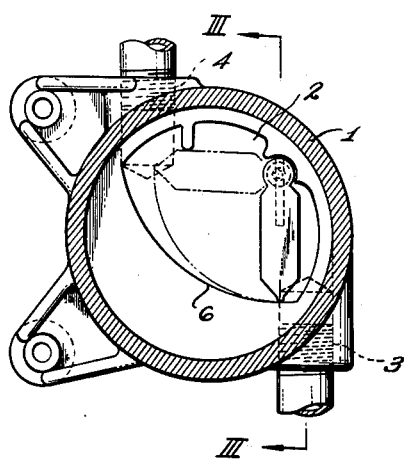
Fig. 2 is a vertical sectional view taken along line II—II of Fig. 3.
Figure 3:
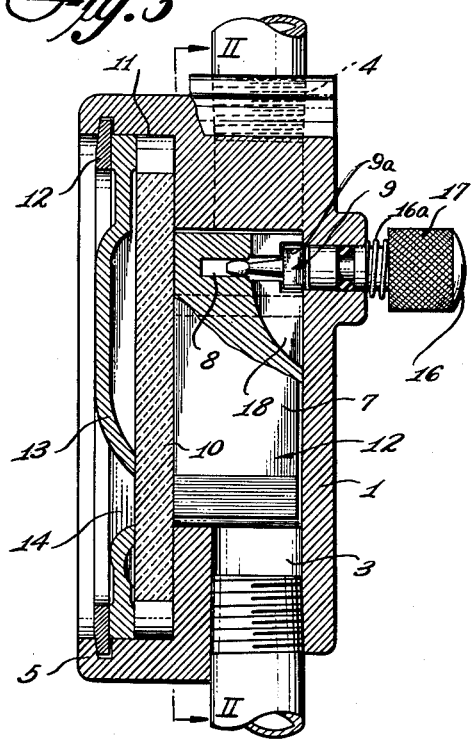
Fig. 3 is a vertical sectional view taken along line III—III of Fig. 2.
Figure 4:
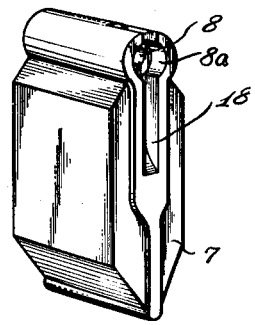
Fig. 4 is a detail perspective view of the barrier shown in Figs. 1, 2 and 3.

As is illustrated in Figs. 1 and 2, the flow chamber is formed by a recess extending from the front 5 of the case to a predetermined depth in the case, the flow chamber recess providing a continuous curved wall 6 which may be formed on an arc or a series of arcs to form a logarithmic curve relative to the arc of the swing of the barrier to be described. Disposed in the flow chamber 2 is a barrier 7 which is preferably a paddle having a width sufficiently less than the depth of the flow chamber bore as to permit the barrier to freely move in the chamber bore. The barrier has a bearing bore 8 to receive a pivot pin 9 mounted in the rear wall of the case 1 and extending inwardly of the case into the flow chamber 2. The pin 9 is located upon a center, which is eccentric to the curved wall 6 of the flow chamber, and the length of the barrier is such that the no-flow position, as indicated in solid lines in Fig. 1, the barrier or paddle 7 will substantially fill the cross section of the flow chamber in which it is then positioned. However, as the barrier or paddle 7 is moved about its pivot away from the no-flow position, there will be a gradually and progressively increasing flow passage between the lower edge of the paddle 7 and the adjacent curved wall 6, permitting progressively increasing quantities of fluid to flow past the barrier.

The inlet opening 3 communicates directly with the interior of the flow chamber 2 so that incoming liquids passing through the inlet opening 3 will impinge upon the rear face of the barrier or paddle 7 and cause the paddle to move about its pivot to assume a position at which the fluid passage between the paddle and the curved wall 6 of the flow chamber 2 is just sufficient to permit a given quantity of fluid to flow through the flow chamber 2 in a given period of time.

The outlet opening 4 communicates directly with the flow chamber 2 at a point disposed on the side of the barrier or paddle 7 opposite to the location of the inlet opening 3 so that fluids passing between the inlet opening 3 and the outlet opening 4 must pass the barrier or paddle 7.

With the construction thus far described, it will be apparent that a predetermined quantity of fluid flowing through the meter in a predetermined length of time will cause the barrier or paddle to assume an angular position relative to its no-flow position corresponding to the quantity of fluid passing through the meter and hence the position of the paddle or barrier 7 may be employed directly as an indication of the quantity of fluid flowing through the meter.

Referring again to Figs. 1 and 2, it will be observed that the front wall of the flow chamber 2 may be formed by means of a suitable transparent member 10 located in a counterbore 11 extending from the front of the casing 1, the transparent wall 10 being held in place by any suitable means such as a snap ring 12. Thus the position of the paddle or barrier 7 may be observed at all times and the position of the paddle as an indication of the quantity of flow through the meter may be observed. To translate the position of the paddle or barrier 7 in terms of quantity of flow, a dial plate 13 may be interposed between the transparent plate 10 and the snap ring 12, having a curved slot 14 formed therein conforming to the arc described by the end of the barrier 7. The dial plate may have graduations 15 spaced along the slot 14 to aid in translating the position of the blade in terms of quantitative flow.

In any event, it will be observed that the paddle or barrier 7 is pivotally mounted within the case to freely move between its no-flow and full-flow positions without resistance of any seal and hence the position assumed by the paddle or barrier 7 will at all times conform with the quantity of flow, regardless of the pressure of the fluid.

From the foregoing it will be observed that there is provided a flow meter in which, by reason of the shape of the flow chamber and the shape of the eccentric mounting of the blade or barrier 7, the position of the blade is at all times indicative of the quantity of fluid passing through the meter.

If, however, the blade should become stuck in any position other than "no-flow," as by reason of the accumulation of sediment or other foreign substance in the fluid, the blade may be dislodged by means of a kicking device 16 which is preferably in the form of an extension of the pivot pin 9 extending through the back of the case and having a handle 17 thereon by which the shaft 16 may be moved into engagement with a slot 18 in the blade and then turned to positively move the blade in either direction.

The pivot pin 9 has a flat relatively wide key portion 9a which normally lies in a circular recess 8a, thereby permitting the blade to rotate freely on its bearing. However, when the kicking device 16 is pressed in against the spring 16a, the key portion 9a will enter the relatively narrow slot 18, permitting the blade 7 to be rotated by rotating the knob 17. This will free the blade 7 in the event it might become stuck by sediment or some other foreign substance.

It should be noted that, by reason of the rounded bearing element on the end of the pivot pin 9, the blade 12 is freely and angularly tiltable on the pivot pin relative to the axis of the pin so that the axis of the rotation of the blade need not lie exactly coincident with the longitudinal axis of the pivot pin. Thus it is unnecessary to provide extreme accuracy in the manufacture of the device in order to secure free rotation of the blade 12.

The kicking mechanism may also be employed as a check to determine whether or not the meter is in operative condition, since if the blade is assuming a position other than no-flow, an observer may operate the kicking mechanism to move the blade away from the indicated position, and thus the return of the blade to the same indicated position will reassure the observer that the meter is properly operating and that the blade has not become stuck due to impurities or foreign matter in the fluid under observation.

While there is shown and described the preferred embodiment of the invention, I do not desire to be limited to any of the details of construction shown and described herein, except as defined in the appended claim.

I claim:

In a quantitative flow meter a housing defining a flow chamber having a wall with a shape substantially at least a sector of a cylinder and having inlet and outlet passages communicating with said flow chamber at spaced points therein; the chamber having a pair of parallel smooth flat spaced interior walls; a barrier blade in said chamber and located between the inlet and outlet passages and extending across the chamber to substantially fill the space between said parallel interior walls; the barrier blade having smooth flat surfaces in closely spaced relation to said parallel walls; the blade having a recess in the upper portion thereof; a pivot comprising a pin carried by the housing and having a rounded bearing element with an axially convex surface lying in said recess and supporting said blade at one of its ends for swinging movement in said chamber eccentrically to said sector shaped wall to progressively increase the space between the blade and the sector shaped wall as the flow through the chamber increases, the blade being freely and angularly tiltable on the pivot relative to the axis of the pivot so that the axis of rotation of the blade need not lie exactly coincident with the axis of the pivot.

References Cited in the file of this patent

UNITED STATES PATENTS

| Number | Name | Date |
|---|---|---|
| 931,484 | Quick | Aug. 17, 1909 |
| 1,614,530 | Lundquist | Jan. 18, 1927 |
| 2,072,369 | Jenson | Mar. 2, 1937 |
| 2,355,694 | Ardelt | Aug. 15, 1944 |
| 2,359,592 | Stokoe | Oct. 3, 1944 |

FOREIGN PATENTS

| Number | Country | Date |
|---|---|---|
| 18,315 | Great Britain | of 1899 |
| 570,403 | Great Britain | July 5, 1945 |